(12) United States Patent
Leberer

(10) Patent No.: US 11,000,025 B2
(45) Date of Patent: May 11, 2021

(54) FLY SWATTER

(71) Applicant: INNOVATIVE MOTION GMBH, Berlin (DE)

(72) Inventor: Thomas Leberer, Berlin (DE)

(73) Assignee: INNOVATIVE MOTION GMBH, Berlin (DE)

( * ) Notice: Subject to any disclaimer, the term of this patent is extended or adjusted under 35 U.S.C. 154(b) by 161 days.

(21) Appl. No.: 16/132,785

(22) Filed: Sep. 17, 2018

(65) Prior Publication Data

US 2019/0082674 A1 Mar. 21, 2019

(30) Foreign Application Priority Data

Sep. 19, 2017 (DE) ..................... 10 2017 121 734.7

(51) Int. Cl.
*A01M 3/02* (2006.01)
(52) U.S. Cl.
CPC .............. *A01M 3/027* (2013.01); *A01M 3/02* (2013.01); *A01M 2200/012* (2013.01)
(58) Field of Classification Search
CPC ................................ A01M 3/02; A01M 3/027
USPC ........................................ 43/132.1, 135, 137
See application file for complete search history.

(56) References Cited

U.S. PATENT DOCUMENTS

| | | | |
|---|---|---|---|
| 1,457,674 A | 6/1923 | Kennedy et al. | |
| 1,515,158 A * | 11/1924 | Miller ..................... | A01M 3/02 43/135 |
| 1,631,864 A * | 6/1927 | Hendrickson ............ | A01M 3/02 43/137 |
| 1,639,292 A | 8/1927 | Hendrickson et al. | |
| 1,861,688 A * | 6/1932 | Crawford ................. | A01M 3/02 43/135 |
| 2,189,360 A | 2/1940 | Haviland | |
| 3,197,917 A * | 8/1965 | Schroeder ............... | F41B 7/003 43/135 |
| 3,292,299 A * | 12/1966 | Mettler .................... | A01M 3/02 43/135 |
| 4,120,114 A * | 10/1978 | Little ....................... | A01M 3/02 43/137 |
| 4,617,754 A * | 10/1986 | Miley ...................... | A01M 3/02 43/137 |

(Continued)

FOREIGN PATENT DOCUMENTS

| | | |
|---|---|---|
| CN | 104542534 A | 4/2015 |
| DE | 254 165 | 12/1911 |

(Continued)

*Primary Examiner* — David J Parsley
(74) *Attorney, Agent, or Firm* — Lazaris IP

(57) ABSTRACT

A fly swatter with a hitting grid and a stem, whereby the hitting grid is joint to the stem by a joint; the hitting grid is rotatable against the force of a spring from a relaxed position about an axis which lies in the plane of the hitting grid and runs perpendicularly to the longitudinal axis of the stem; the hitting grid is lockable in a pre-loaded position with a locking device, and the locking mechanism of the locking device is releasable by way of a trigger, is characterized in that the joint with the turning axis of the hitting grid is assembled between the stem and the hitting grid; the locking device is assembled remote to the trigger; and a string, a wire or different transmission are provided, which transfer a triggering force from the trigger onto the locking device.

5 Claims, 6 Drawing Sheets

(56) References Cited

U.S. PATENT DOCUMENTS

| | | | | |
|---|---|---|---|---|
| 4,974,360 A | * | 12/1990 | Davis | A01M 3/02 |
| | | | | 43/135 |
| 5,377,446 A | | 1/1995 | Dileo | |
| 7,165,355 B2 | * | 1/2007 | George | A01M 3/022 |
| | | | | 43/135 |
| 2006/0032112 A1 | | 2/2006 | George | |

FOREIGN PATENT DOCUMENTS

| | | |
|---|---|---|
| DE | 324 234 | 4/1913 |
| DE | 296 20 891 U1 | 3/1997 |
| EP | 0059885 | 9/1982 |
| EP | 0 461 397 B1 | 12/1991 |

\* cited by examiner

FLY SWATTER

CROSS REFERENCE TO RELATED PATENT APPLICATIONS

To the fullest extent permitted by law, this nonprovisional utility patent application claims priority under 35 U.S.C. § 119 to Germany Patent Application No. 10 2017 121 734.7, with a filing date of Sep. 19, 2017.

STATEMENT REGARDING FEDERALLY-SPONSORED RESEARCH OR DEVELOPMENT

Not applicable.

TECHNICAL FIELD

The invention relates to a fly swatter with a hitting grid and a stem, wherein the hitting grid is hinged to the stem by means of a joint. The hitting grid is rotatable against the force of a spring from a relaxed position about an axis which lies in the plane of the hitting grid and runs perpendicularly to the longitudinal axis of the stem. The hitting grid is lockable in a pre-loaded position with a locking device, and the locking mechanism of the locking device is releasable by way of a trigger.

Irritating flies, mosquitos, and other insects can be killed by means of a fly swatter. Simple fly swatters have a long-stemmed handle and a surface on a hitting grid which is whacked onto the insect. A disadvantage is that the insect recognizes the incoming danger, for example by movement or draft, and flies away. Therefore, it is important that neither the person with the swatter nor the swatter itself are recognized too early and that a fast motion is carried out so that the insect has no time to escape.

BACKGROUND OF THE INVENTION

DE 296 20 891. UI discloses a fly swatter pistol, where a firing pin is ejected with the target area by means of a pressure spring after release of a tension lever.

EP 0461 397 B1 discloses a fly swatter with a grid-shaped plate which is hinged to an elongated handle. In an open resting position, the plate is spring-loaded.

DE 254165 discloses a pistol-like device for killing insects, where two metal strips, connected to each other and held apart in a jaw like fashion in the locked position, are shut when releasing a trigger device.

The assemblies mentioned above consist of various materials and are constructed in a complex way. As a result, the production is expensive and the assemblies are vulnerable.

DE 324 235 discloses a flytrap, operating according to the type of a hitting shutter, for catching and destroying insects, where a loop-shaped, springy bat is held in the resting position by a trigger in such a way, that it strikes forward when pressure is exerted on the trigger. The bat is fastened to a pistol-like handle. The bat is formed by a wire, whereby a grid-shaped front part is at a lever which provides a spring at its free end. The spring is therefore separated from the grid-shaped front part by the lever. The assembly is, thereby, strongly bent in the pre-loaded state and the bat must cover a comparatively long way before it strikes the point of impact. Correspondingly, there is the danger of the insect noticing the movement and escaping.

BRIEF SUMMARY OF THE INVENTION

It is an object of the invention to provide a device of the above-mentioned kind, where the insect recognizes a danger as late as possible and can be easily and inexpensively produced.

According to the invention this object is achieved in that
- the joint with the turning axis of the hitting grid is assembled between the stem and the hitting grid;
- the locking device is arranged remote to the trigger; and
- a string, a wire or any other kind of means of transmission are provided, which transfer a triggering force from the trigger to the locking device.

In this way, the hand that activates the trigger is remote to the insect and the insect does not immediately sense the movement. At the same time, the assembly has a simple design. A pistol-form is not necessary. The means of transmission in the form of a simple string or wire can be easily mounted and is available at little cost. The location of the joint between the stein and the hitting grid only requires a short distance of the hitting grid. Thus, less time passes until the insect is hit, which is not enough to escape.

Preferably, it is provided that the joint comprises a head which is connected firmly to the stem and at least one hinge which is provided at the head and cooperates with a bearing which is firmly connected to the hitting grid. The head may be provided with a mass which is larger than the mass of the hitting grid. Hence, the head can well absorb the forces. The stem can then be slim. In this way, the use of inexpensive plastic is possible.

In particular, a joint rod can be accommodated in the bearing through which the at least one hinge is rotatably led. The spring can be a spiral spring. The spiral spring can be assembled around the joint rod. However, it is also possible to use other means for generating a preload.

A particularly simple and inexpensive modification of the invention provides that the spiral spring is manufactured from wire and the wire, in extension, forms linear wire sections which are mounted in the grooves in the hitting grid. The forces when recoiling the hitting grid by the spring force are then transferred evenly onto the hitting grid. The hitting grid itself only needs to transfer small forces or no forces.

A particularly advantageous solution provides that the hitting grid is provided with webs which have a drop-shaped or other aerodynamically optimized cross-section, such that the draft generated by the rotation of the hitting grid is minimized in the range of the insect which is to be hit. As a result, the insect only notices the approaching hitting grid very late and cannot escape anymore.

A further modification of the invention provides that the stem is a telescope stem with variable length. When extending, only the cord or the wire need to be extended at the trigger. However, it is also possible to design a part of the stem as an extendable handgrip. The length of the string or the wire then stays the same. With a longer stem or a longer handgrip, distant insects can also be reached.

The means for locking can comprise a hook or a latch element, into which the edge of the hitting grid is releasably lockable pre-loaded by the spring. The hitting grid is released by simple pulling off the hook or latch element.

Modifications of the invention are subject matter of the subclaims. An embodiment is described below in greater detail with reference to the accompanying drawings.

Definitions

In this description and in the accompanying claims all terms have the meaning well known to the person skilled in the art which is defined in technical literature, norms and the relevant websites and publications, in particular of the lexical kind, such as www.wikipedia.de, www.wissen.de or www.techniklexikon.net, of competitors, research institutes, universities and associations, such as, for example, Verein Deutscher Ingenieure.

DETAILED DESCRIPTION OF THE INVENTION

Figure 1:
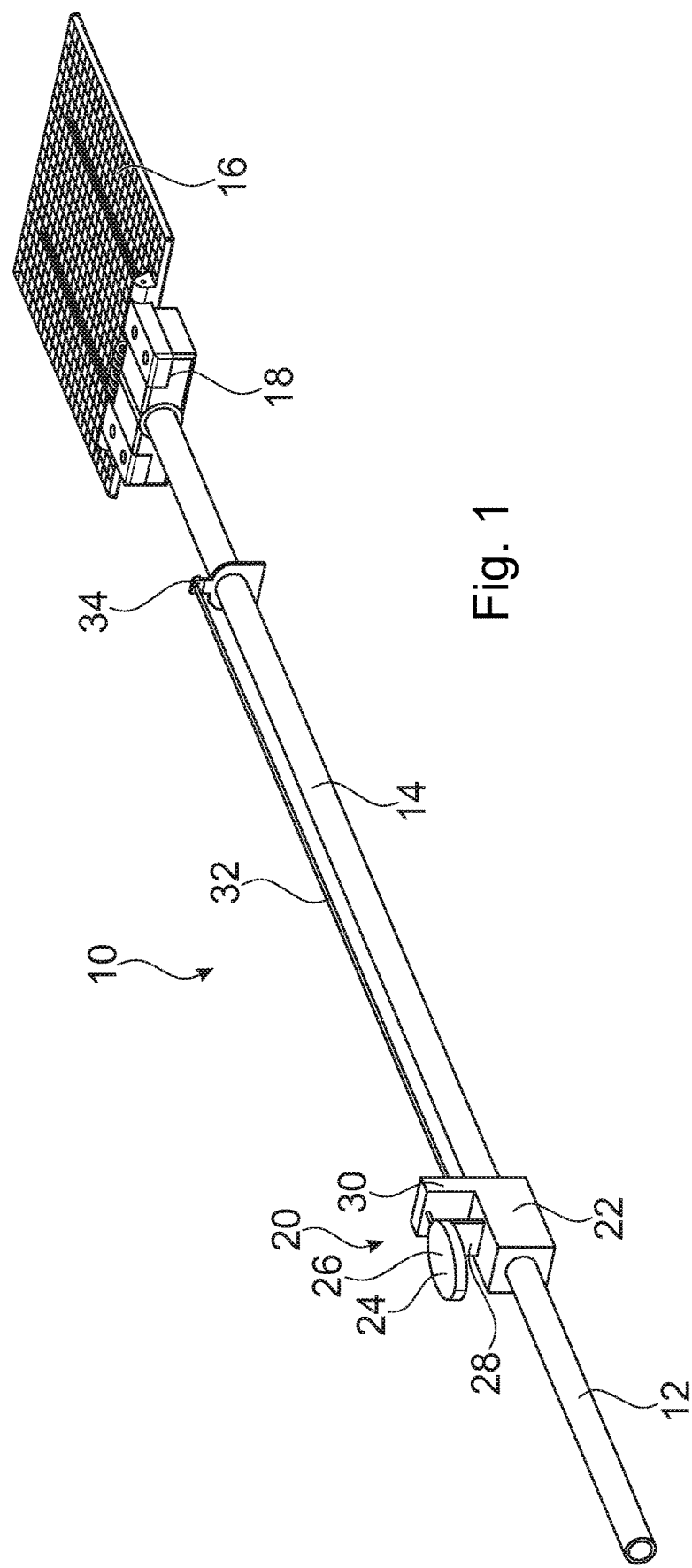
FIG. 1 is a perspective view of a fly swatter in its relaxed state.

FIG. 1 shows a fly swatter generally designated with numeral 10. The fly swatter 10 comprises a handgrip 12, a stem 14 and a hitting grid 16. The handgrip 12 is aligned with the stem 14 and is essentially designed rod-shaped like the stem. The hitting grid 16 is joint to the stem 14 in the manner described below. The rotational axis of the joint 18 provided for this purpose extends in the plane of the hitting grid 16 perpendicularly to the longitudinal axis of the stem 14.

A trigger 20 is molded to the rod forming the handgrip 12 and the stem 14 between the handgrip and the stem 14. The trigger 20 comprises a broadened base 22. An angle 24 is attached to the base 22. The angle 24 provides a first leg 26 parallel to the longitudinal axis of the stem 14 which forms an imprint surface. A second leg 28 of the angle 24 extends perpendicularly thereto and connects the first leg 26 to the base 22.

The base 22 has an angular design and provides a projection 30 extending perpendicular to the stem 14. A wire or a string 32 is led through the projection 30. One end of the string 32 is attached to the angle 24. The other end of the string 32 is attached to a hook 34. The hook 34 forms a latch element and is provided just before the end of the stem 14. It extends upwards in FIG. 1. The hook 34 is shown once again in greater detail in FIG. 3.

Figure 2:
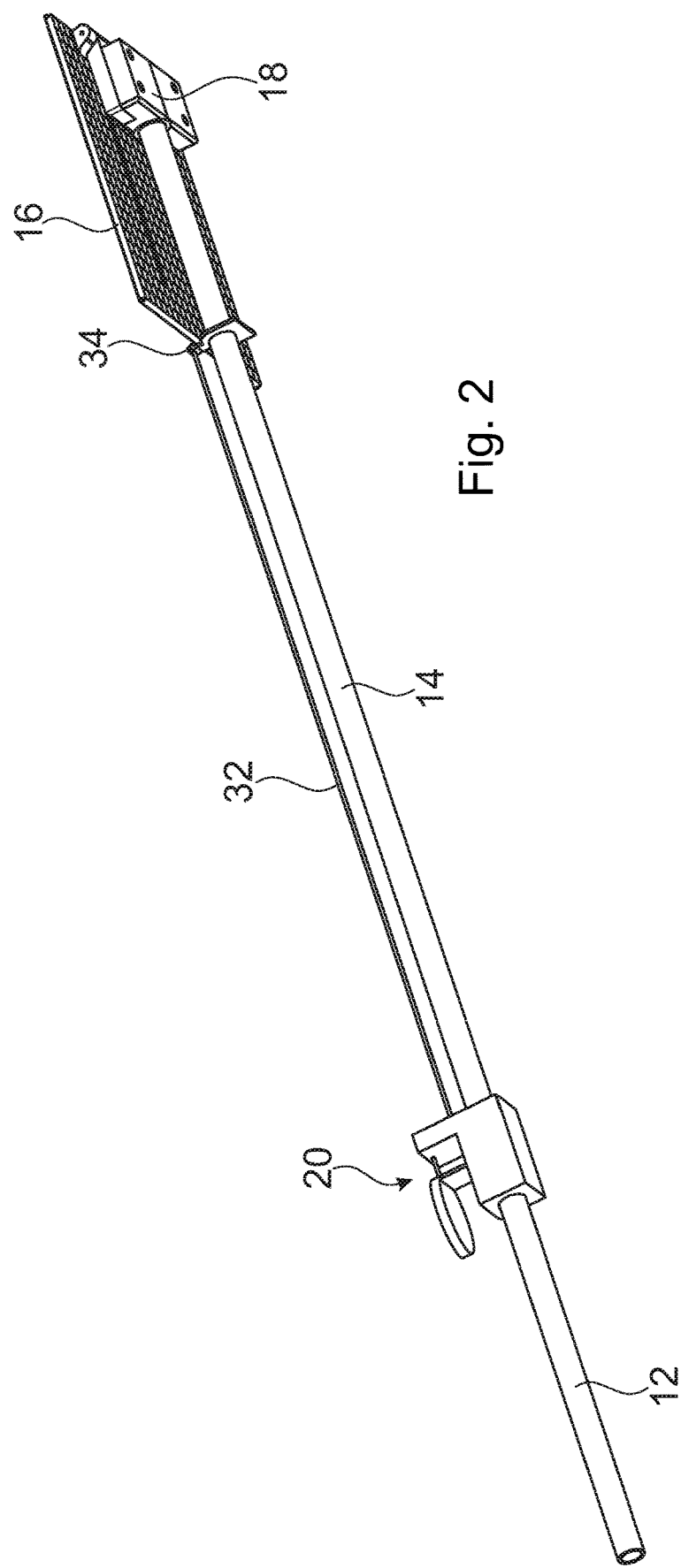
FIG. 2 is a perspective view of the fly swatter from FIG. 1 in its pre-loaded state.
Figure 3:
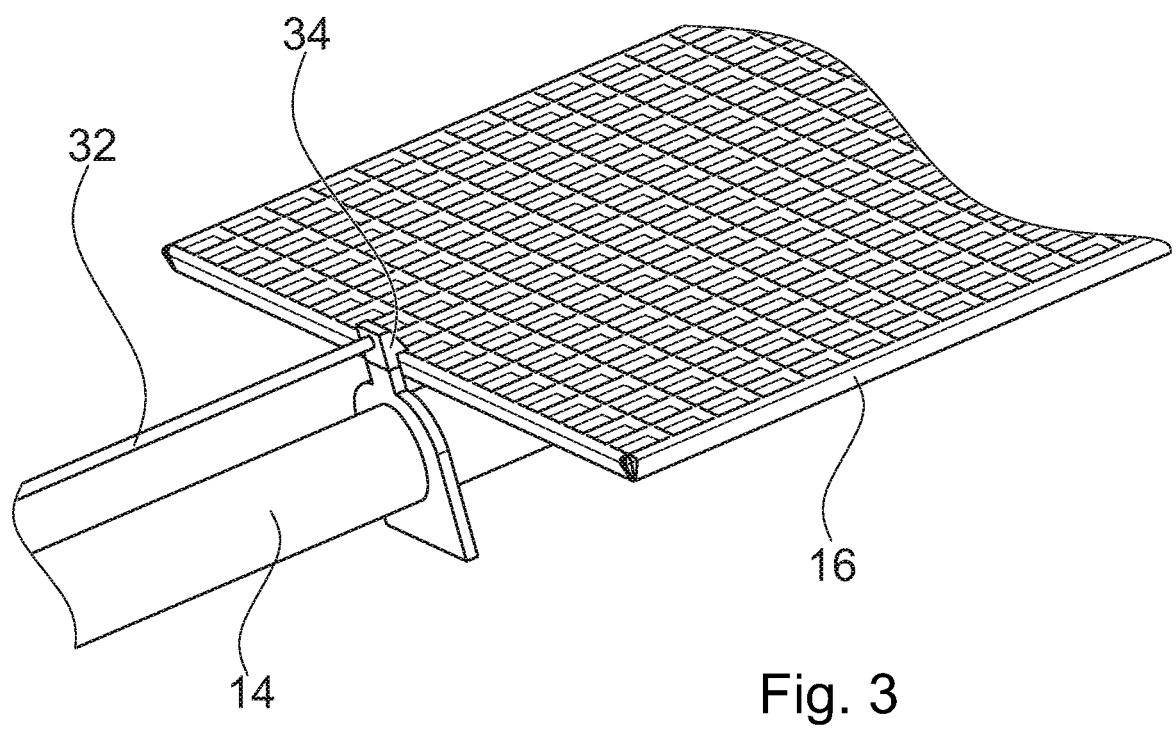
FIG. 3 shows a detail from FIG. 2, where one can see how the hitting grid of the fly swatter is held at the handle under pre-loading.

When pressure is applied downwards onto the imprint surface of the trigger 20 in FIG. 1, the leg 26 moves down and pulls the string 32. The upper part of the hook 34 is then moved backwards towards the trigger 20. The hitting grid 16 can be held in a pre-loaded state with the hook 34 until the trigger 20 is activated. The pre-loaded state is shown in FIGS. 2 and 3. It can be seen that the hitting grid 16 was rotated about an angle of approximately 180° towards the handgrip 12 and was fixed with the hook 34 in this state.

Figure 4:
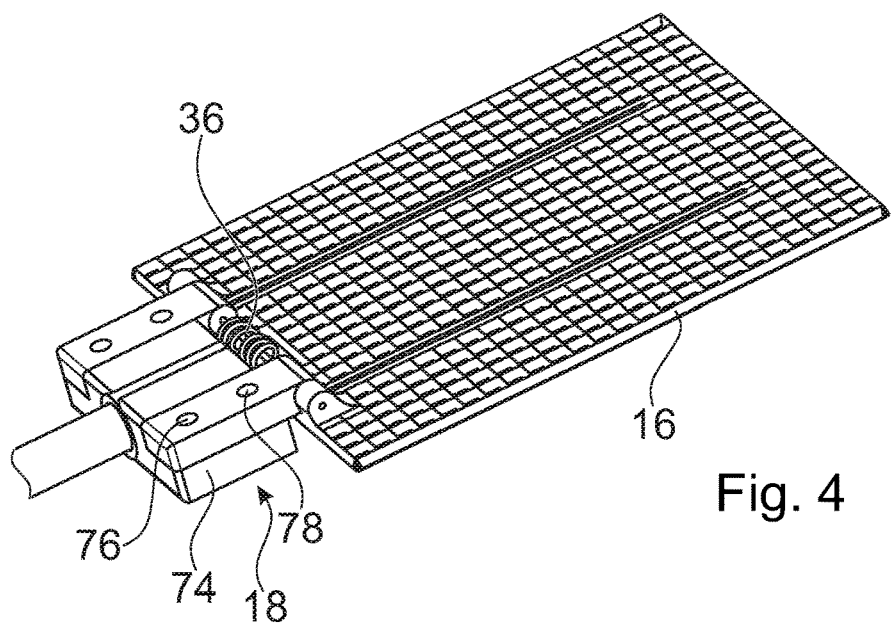
FIG. 4 shows a detail from FIG. 1 with the hitting grid, spring, joint and a part of the handle.
Figure 8:
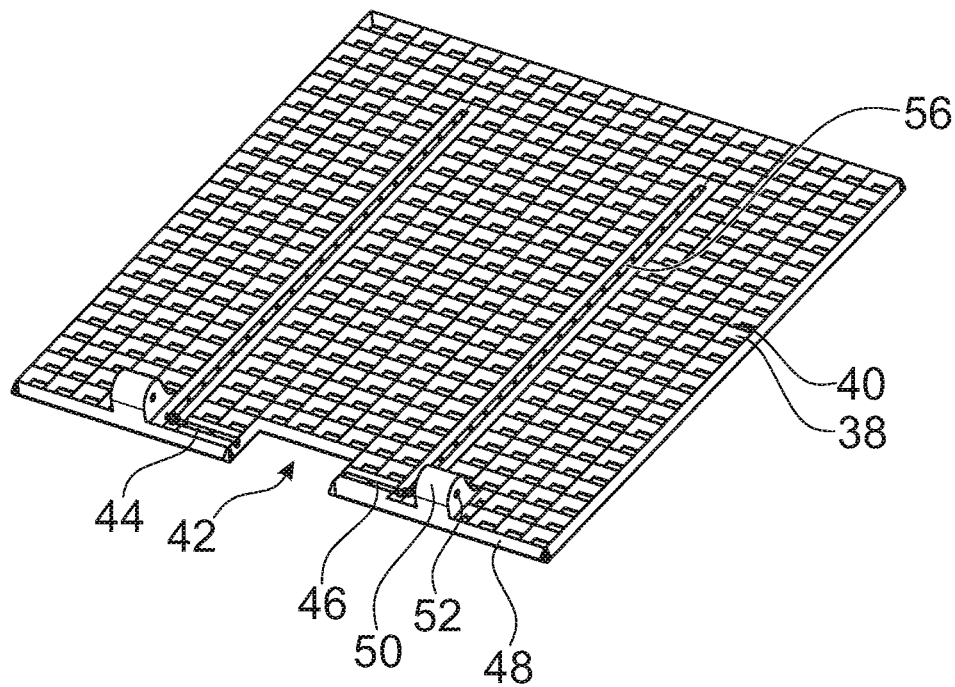
FIG. 8 separately shows the hitting grid without the spring for a fly swatter according to FIG. 1.

FIG. 4 shows, in detail, the hitting grid 16 with the spring 36 and the joint 18. The hitting grid 16 is a part molded from plastic which is separately illustrated once again in FIG. 8. The hitting grid 16 forms a planar, rectangular grid with webs 38 and 40 at right angles to each other. The webs 40 run in stem-direction. The webs 38 are orientated perpendicular thereto. The spaces are measured in the way common for fly swatters, so that the insects to be killed are reliably hit, but enough air flows through the formed gaps such that the insect to be killed notices the approaching hitting surface only very late.

The hitting grid 16 has a recess 42 on the side facing the stem 14. Two elongated grooves 44 and 46 are provided by the recess 42. The grooves 44 and 46 initially run parallel to the edge 48. The predominant part 54 of the grooves 44 and 46 runs at right angles to the edge 48 across a big part of the hitting grid 16. A projection 50 with a bore hole 52 is provided on both sides, respectively, of the recess 42 and the short part of the grooves 44 and 46. The projections 50 with the bore holes 52 form the first part of the joint 18 described hereafter.

Figure 6:
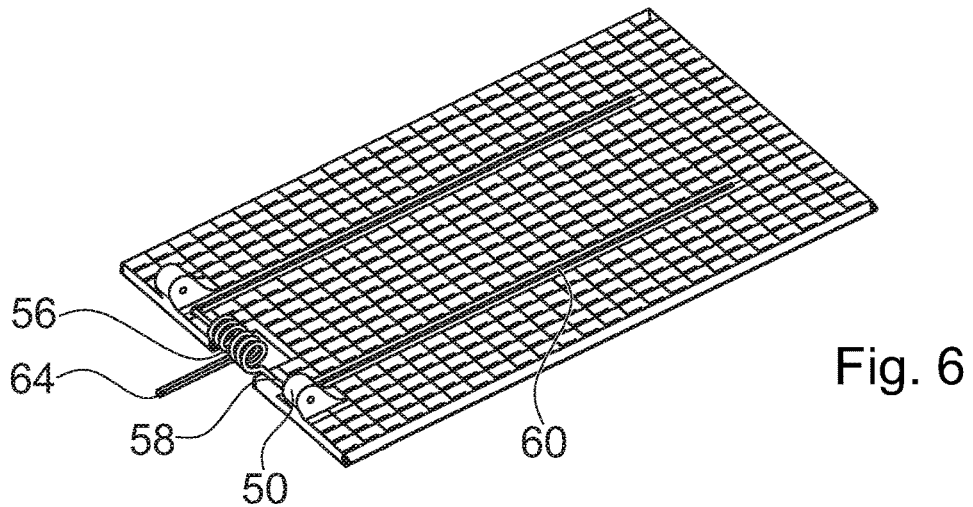
FIG. 6 separately shows the hitting grid with the spring.
Figure 7:
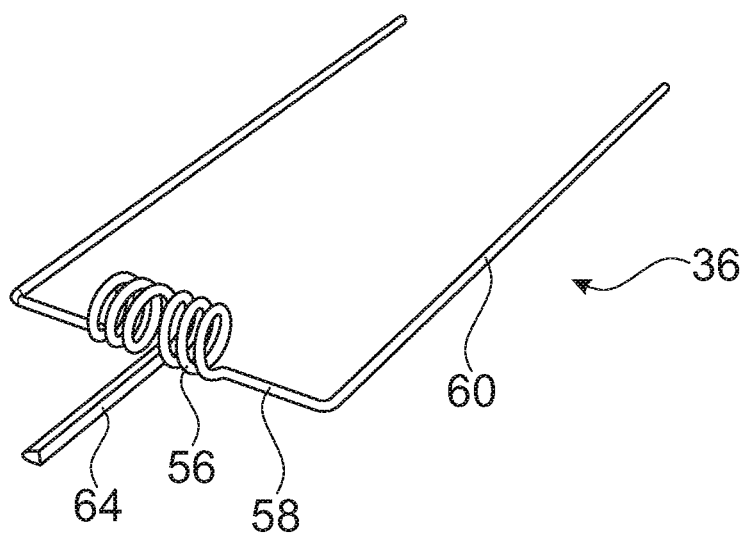
FIG. 7 separately shows the spring for a fly swatter according to FIG. 1.

The spring 36 is mounted in the grooves 44 and 46, as shown in FIG. 6. The spring 36 is separately shown in FIG. 7. The spring 36 consists of a wire which provides a spiral-shaped middle section 56. It is located in the recess 42, as is clearly visible in FIG. 6. Linear wire sections 58 and 60 are joined to the spiral-shaped middle section 56 on either side. The linear wire sections 58 and 60 form an angle and are measured in a way, such that they are precisely mounted in the grooves 44 and 46. This can be clearly seen in FIG. 6. The spiral-shaped middle section 56 disembogues centrally in an extension 64 which serves for attachment to the stem 14. To this end, two bore holes are provided into which the ends are inserted.

Figure 5:
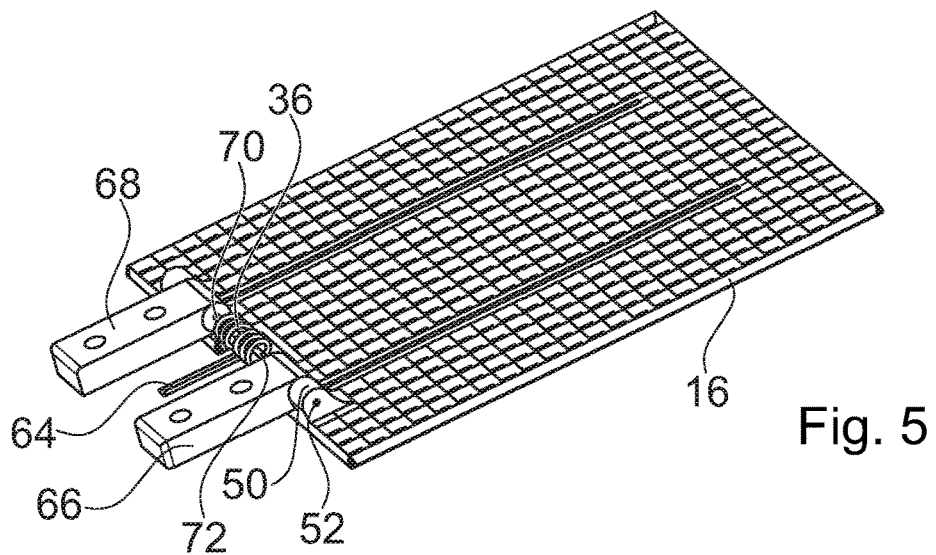
FIG. 5 corresponds to the view in FIG. 4, but with the joint exposed.

FIGS. 4 and 5 illustrate how the hitting grid 16 is hinged to the stem 14 with the spring 36. Two hinges 66 and 68, each with a bore hole 70 on the side of the hitting grid, are inserted into the area between the recess 42 and the projection 50, such that the bore holes 52 and 70 align. A joint rod 72 is led through the bore holes 52 and 70. The hinges 66 and 68 lie on the linear wire sections in the grooves 44 and 46 and thus hold the spring 36 in place.

The hinges 66 and 68 are essentially cuboid-shaped and are also made of plastic. The hinges 66 and 68 each provide two bore holes 76 and 78, by which means they are pinned are screwed with a head 74. The head 74 is also made of plastic. The head 74 is attached to the stem-end of the stem 14 by means of a bore hole and is clamped there or fixed by different means. In this way, the hitting grid 16 is rotatably attached to the stem 14.

The spiral-shaped middle section 56 of the spring 36 presses the hitting grid into a relaxed position which is shown in FIG. 1. The force is thereby transferred onto the extent of the whole grid 16 via the linear sections 60. The plastic material is therefore only slightly strained. The hitting grid 16 can be rotated about an angle of 180° against the spring force of the spring 36. The pre-loaded hitting grid 16 can be latched at the hook 34 and fixed in this state. By activating the trigger 20, the hook 34 is released and the hitting grid 16 snaps from the pre-loaded state in FIG. 2 into the relaxed state, shown in FIG. 1.

The motion of the hitting grid 16 is similar to that of a mouse trap in that it is caused by the wire spring 36. The motion is carried out correspondingly fast. Activating the trigger 20 which also requires a small motion, namely by hand, is carried out a little distance apart from the movement of the hitting grid 16. Due to the distance, the insect is, therefore, not warned by the preceding motion.

Figure 9:
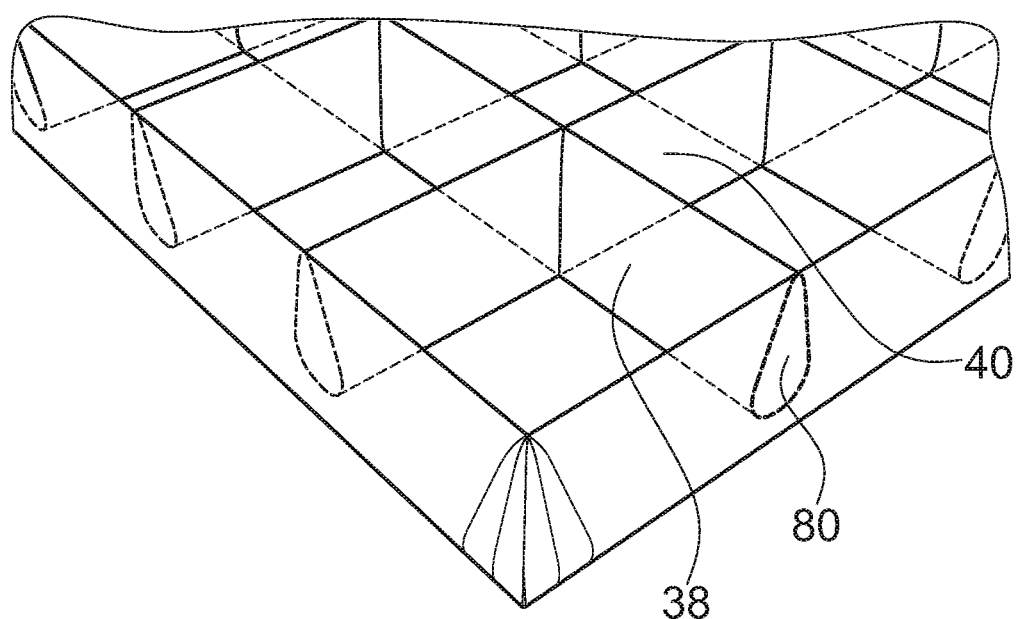
FIG. 9 is an enlarged detail of the hitting grid from FIG. 8, where the aerodynamic form of the grid webs can be recognized.

The hitting grid 16 is made of plastic. This allows for a grid form which is shown in FIG. 9. The webs 38 and 40 have a drop-shaped cross section 80. Thus, the webs 38 and 40 are pointed in the hitting-direction in an aerodynamically particularly advantageous way. The end opposite to the hitting motion is rounded off. Hence, the air is stirred up in a way such that the insect only notices the draft that comes with the motion of the hitting grid 16 late and cannot escape anymore.

A further advantage of the assembly is that the hitting grid 16 is mounted on a comparatively massive head 74 with comparatively massive hinges 66 and 68. It can absorb the transferred forces well. Accordingly, the remaining part of the fly swatter, namely the hand grip 12, stem 14 and trigger 20, may be realized using little material. A pistol-like assembly, as is known from the prior art, is not necessary. The entire assembly is constructed in a particularly simple way and can, apart from the spring and string, be manufactured from inexpensive plastic.

In an embodiment not shown, the stem 14 stem is a telescope stem which is extendable. In this way, it is also possible to reach insects at more distant locations, perhaps in the upper region of the wall.

The embodiments described above serve as an illustration of the invention claimed in the claims. Features which are discloses together with other features can also be used alone or in combination with other features disclosed explicitly or implicitly in the embodiments of the text or drawings. Dimensions and sizes are only given by way of example only. The person skilled in the art will derive suitable ranges from his/her expertise in the technological field and, therefore, does not require further explanation here. The disclosure of a specific modification of a feature does not mean that the invention should be limited to this specific modification. Rather, such a feature can be realized by a great number of different modifications well known to a person skilled in the art. The invention can, therefore, be realized not only in the form of the embodiments explained here, but by all embodiments covered by the scope of the accompanying claims.

The terms "above", "below", "right" and "left" refer solely to the enclosed drawings. It is clear that the claimed devices can also take on a different orientation. The term "comprises" and the term "includes" entail that further, not-mentioned components can be provided. Included by the terms "essentially", "predominantly" and "mainly" are all features which have a prevailing characteristic or prevailing content, meaning more than all other named components or characteristics of the feature, so for two components more than 50%, for example.

What is claimed is:

1. A fly swatter comprising
a planar hitting grid, said hitting grid defining a plane;
a stem having a longitudinal axis;
a joint for joining said hitting grid to said stein, said joint defining a rotational axis which lies in said plane of said hitting grid and extends perpendicular to said longitudinal axis of said stem;
a spring positioned along an edge of the hitting grid and exerting a force on said hitting grid wherein said hitting grid is rotatable against said force of said spring from a relaxed position about said rotational axis wherein said spring is a spiral spring comprised of a wire with wire extensions forming wire sections, said hitting grid having grooves that extend along the edge of the hitting grid and perpendicular to the edge on an outer surface of the hitting grid for accommodating each of said wire sections;
a locking device for locking said hitting grid in a pre-loaded position, said locking device having a locking mechanism; and
a trigger for releasing said locking mechanism from said pre-loaded position to a released position,
such that said joint with said rotational axis is positioned between said stem and said hitting grid, said locking device is provided remote to said trigger, and a transmission element is provided that transfers a triggering force from said trigger to said locking device, wherein said hitting grid has webs which have a drop-shaped-cross-section, such that a draft generated by rotation of said hitting grid is minimized in the range of the hit insect,
and wherein said hitting grid is made of plastic material.

2. The fly swatter of claim 1, and wherein said joint comprises a head which is firmly connected to said stem and at least one hinge is provided at said head, said hinge cooperating with a bearing firmly connected to said hitting grid.

3. The fly swatter of claim 2, and wherein a joint rod is rotatably accommodated in said bearing and said at least one hinge rotatably extends through said joint rod.

4. The fly swatter of claim 1, and wherein said stem is a telescope stein with variable length.

5. The fly swatter of claim 1, and wherein said locking means comprise a hook or a latch element, adapted to releasably engage with said edge of said hitting grid pre-loaded by said spring.

* * * * *